3,239,498
SILICA-CONTAINING CATALYSTS
Donald R. Witt, Bartlesville, Okla., assignor to Phillips Petroleum Company, a corporation of Delaware
No Drawing. Filed July 20, 1961, Ser. No. 125,348
27 Claims. (Cl. 260—94.9)

This invention relates to a method of preparing improved silica-base catalysts, to the improved catalysts, and to the use of these catalysts in the polymerization of olefins.

An object of the invention is to provide improved catalysts and a method of making such catalysts. Another object is to provide a catalyst of improved activity for the polymerization of olefins. A further object is to provide an olefin polymerization process which effects an improved yield of polymer. Other objects of the invention will become apparent upon consideration of the accompanying disclosure.

The invention is based upon the discovery that olefin and diolefin polymerization catalysts comprising oxides of chromium, molybdenum, vanadium, nickel, and cobalt supported on a silica or silica-alumina type base are rendered more active by preliminary conditioning of the support or base material by ball milling the support, in particulate form, in the presence of an inert low viscosity liquid whose molecules contain oxygen such as water, alcohols, and ketones. The ball milling is effected for at least an hour and until the particle size of the silica or silica-alumina type support is reduced to an average size below 25 microns and preferably below 10 microns.

Materials such as silica, alumina, boria, thoria, titania, zirconia, etc., have long been known to have catalytic properties. Silica and silica-alumina type catalysts, for example, are currently used in petroleum cracking operations. In addition, the previously mentioned oxides enjoy wide usage as supports for an infinite variety of materials, organic or inorganic, liquid or solid, such that the combination of support and substrate exhibit a wide range of catalytic properties. Although the mechanisms of catalysis are little understood, it is generally believed that the function of the silica-alumina in a silica-alumina supported chromium catalyst, for example, is not merely that of an extender, but that of an active and vital participant in the catalysis of polymerizations. At least one of the oxides of alumina, boria, thoria, titania, and zirconia may be used to advantage in combination with the silica base.

It has been discovered that if silica or silica-alumina catalyst supports, either the commercially available or the freshly prepared materials, are ball milled in the presence of a relatively large amount of certain inert liquids, the activity after subsequent impregnation with a metallic promoter is significantly improved. For example, if a silica support is ball milled in the presence of methanol, the activity of the finished catalyst after drying and impregnating with chromium oxide is greatly superior to the activity of a chromia-silica catalyst which has not been ball milled or which has been only dry ball milled. Other promoters such as the oxides of nickel, cobalt, vanadium, molybdenum, etc. may be used on silica, or silica-alumina. Other suitable liquid media are water, ethanol, propanol, acetone, methylethylketone, Cellosolve, etc. Cyclohexane, an inert liquid which does not contain structural oxygen, is ineffective.

A preferred liquid for the ball milling step comprises $C_1$–$C_8$ aliphatic hydroxy containing compounds which are liquids at 32° F. and which boil below 400° F. at 760 mm. Examples of this class of liquids include methanol, ethanol, isopropanol, butanol-2, pentanol-1, 2-methyl-butanol-4, hexanol-3, heptanol-2, 2,4-dimethyl-pentanol-2, octanol-2, propylene glycol. Methyl and isopropyl alcohols are naturally preferred because of convenience, cost, and availability.

The reason for the improvements observed is not understood. The milling treatment reduces the particle size of the siliceous solid. However, neither the surface area nor pore diameter, the two generally important physical properties of such bodies, is significantly changed. The improvement in the performance of the finished catalyst is, nevertheless, a striking one.

In the exercise of this invention, a silica, or a silica-alumina containing about 1–15% alumina is charged into a conventional ceramic ball mill equipped with conventional ceramic balls. The mill is filled to less than ¼ or ½ capacity with solid and milling liquid in the approximate ratio of 1 part solid to 1 part liquid by weight. The quantity of liquid must be in excess of that required to completely wet the silica or silica-alumina, so that there is free liquid present. It is milled for 1–100 hours, usually at about 120 r.p.m. and at ambient temperature, until the average particle size is less than about 25 microns and, preferably less than about 10 microns. It is preferred to start with silica particles of less than about 30 mesh size. The ball milling treatment is a conventional treatment such as might be obtained in conventional ball milling equipment. Other similar milling equipment such as a hammer mill or a rod mill may be used.

At the completion of the milling, the slurry is allowed to remain undisturbed for 1–16 hours and the free supernatant liquid is then decanted off. The wet silica-containing cake is then dried at 200–400° F. for 2–20 hours in an oven or equivalent heating device.

The dried silica containing material is then impregnated with a solution of the metal promoter. For example, a chromia promoted catalyst is prepared by impregnation of the silica with a solution of chromium oxide or a compound convertible to chromium oxide by calcination such as, for example, chromic chloride, chromic nitrate, etc., or other soluble salts of chromium. After impregnation the mixture is dried and activated for periods of several hours up to 50 hours or more at temperatures of 750 to 1500° F. in the presence of an oxygen-containing gas followed, optionally, by further activation treatment in a reducing-gas-containing atmosphere. Following the activation treatment the finished catalyst is stored under an inert gas, such as nitrogen, until used as a catalyst in polymerization or other reaction.

A chromia containing catalyst so prepared, for example, is an excellent catalyst for the polymerization of ethylene. The catalyst and ethylene are contacted together at a temperature in the range of 100–400° F. and at a pressure in the range of 0–2000 p.s.i.g. The reaction time ranges from 0.1 minute to 10 hours, preferably 0.5 to 5 hours. The process may be carried out in the presence or absence of a diluent. However, a diluent is preferred and saturated hydrocarbons such as cyclohexane or isooctane are frequently used for this purpose in amounts in the range of 1 to 100 parts diluent per part polymerizable monomer. Any conventional polymerization technique such as the use of a stirrer equipped batch reactor, a fixed catalyst bed continuous system, or a suspended catalyst continuous system is used. In a fixed bed reactor the liquid hourly space velocity of the feed ranges from 0.1 to 600. Whichever technique is used, the rate of ethylene addition depends to a significant degree upon the amount of catalyst initially charged or upon the rate of catalyst addition if the system is continuous. The amount of catalyst employed depends upon the desired rate of polymer production and the capacity of the polymerization equipment, particularly in regard to its ability to conveniently dissipate the heat of reaction. In general, the catalyst in the reaction zone is present in an amount from about 0.01 to 10.0 weight percent of the monomer present.

At the end of the reaction period, the polymer may be recovered by any suitable method. The solid polymers, for example, may be recovered by such methods as solvent precipitation, coagulation, evaporation, and the like.

EXAMPLE I

*Effect of milling silica gel on the polymerization of ethylene*

A series of ethylene polymerization runs were carried out using a chromia-silica catalyst. The silica portion of the catalyst, a commercial material containing only 0.04 wt. percent alumina, was treated in several ways before being impregnated with chromia. The runs involving milling were carried out by ball milling about 100 g. of silica and about 100 g. of liquid for 3 hrs. at ambient temperature in a 1 liter ball mill containing ceramic balls. Following the milling the slurry was allowed to settle overnight and the supernatant liquid was decanted. The wet silica was then dried for 2 hrs. under a heat lamp. The dried silica was then impregnated with an aqueous solution of $CrO_3$ so that the finished catalyst contained 1.8–3.0 weight percent chromia (as Cr).

The indicated quantity of the prepared catalyst was charged into a 1.0 liter stainless steel agitated reactor together with approximately 100–150 g. ethylene and 340 g. cyclohexane. The reaction was carried out for 1 or 1.5 hrs. at 285° F. and 450 p.s.i.g. The polymer was isolated by evaporation of the cyclohexane and other volatiles. The activity of the catalyst was reported in terms of grams of polymer produced per gram of catalyst per hour. The results of this series are shown in Table I.

TABLE I

| Run No. | Catalyst Used, g. | Cr in Cat., percent | Milling Liquid | Silica Surface Area, m.²/g. | Silica Pore Diam., A. | Silica Approx. Particle Size | Polyethylene Productivity, g./g. Cat./hr. |
|---|---|---|---|---|---|---|---|
| 1 | 0.14 | 2.5 | Not Milled | 720 | 40 (approx.) | 30–200 U.S. Mesh | 209 |
| 2 | 0.06 | 2.3 | Water | 721 |  | 10–0.01μ | 497 |
| 3 | 0.18 | 2.0 | Cyclohexane [1] | 605 | 40 | 10–0.01μ | 224 |
| 4 | 0.10 | 3.0 | Methanol |  |  |  | 606 |
| 5 | 0.47 | 2.0 | Dry Milled | 569 | 44 | 5–.02μ | 211 |

[1] 1.5 hr. reaction period.

EXAMPLE II

*Effect of milling silica-alumia on polymerization of ethylene*

Another series of runs, similar to that of Example I, was carried out except that a commercial coprecipitated silica-alumina preparation containing about 13% by weight alumina was used as the starting material. The results of this series are shown in Table II.

TABLE II

| Run No. | Catalyst Used, g. | Cr. in Ct., percent | Milling Liquid | Si-Al Surface Area, m.²/g. | Si-Al Pore Diam., A. | Si-Al Approx. Particle Size | Polyethylene Productivity, g./g. Cat./hr. |
|---|---|---|---|---|---|---|---|
| 6 | 0.068 |  | Not Milled | 540 | 65 (approx.) | 100–300 U.S. Mesh | 1,200 |
| 7 | 0.061 | 1.8 | Water | 513 | 66 | 10μ | 1,977 |

Several additional experiments were carried out using as starting material, not the commercial coprecipitated

TABLE III

| Run No. | Catalyst Used, g. | Cr. in Ct., percent | Milling Liquid | Surface Area, m.²/g. | Pore Diam., A. | Approx. Particle Size | Productivity, g./g. Cat./hr. |
|---|---|---|---|---|---|---|---|
| 8 | 0.94 | 2.1 | Not milled | 558 | 47 | 100–300 U.S. Mesh | 84.5 |
| 9 | 0.064 | 2.2 | Water |  |  | 10μ | 1,413 |
| 10 [1] | 0.074 | 2.5 | Water | 626 | 51 | 10μ | 1,040 |

[1] Silica and alumina (approx. 89:11) were milled together in this run followed by drying, chromia impregnation, etc.

silica-alumina, but a silica which was impregnated after milling with $Al(NO_3)_3$ such that after calcination at 1000° F. the silica contained 5.8–8.7% alumina. The silica-alumina so prepared was impregnated with chromia and used in a polymerization reaction as before. The results of this series are shown in Table III.

EXAMPLE III

*The effect of wet milling and fluoriding silica-alumina on the polymerization of ethylene*

A 12.46 g. quantity of ball milled 87:13 silica-alumina (milled in the presence of water as in Example II and containing about 15% moisture) was dispersed in 25 cc. water containing 0.53 g. chromic oxide and 0.45 g. ammonium fluosilicate. After drying and activating in air for 5 hrs. at 1000° F., a 0.038 g. portion of this prepared catalyst (containing a nominal 2.5% chromium) was charged into a 1.0 liter stainless steel agitator equipped type reactor together with 340 g. dry cyclohexane and approximately 100–150 g. ethylene. The reaction was allowed to proceed for 1 hr. at 285° F. and 450 p.s.i.g. The yield of polymer obtained supported a productivity rate of 2617 g. polymer/g. catalyst/hr.

The polyethylene polymer recovered from the catalyst process of the invention, as illustrated in the preceding examples, is a high density, high quality polymer. For example, a typical product of Example II exhibited the following physical properties:

Density (g./cc.) _____ 0.9612
Inherent viscosity [1] _____ 2.76
Melt index [2] _____ 0.10

[1] In decalin at 135° C.
[2] ASTM D1238.

The fluoriding step may be effected with other compounds which do not introduce deleterious components into the catalyst. Ammonium fluoride is effective and suitable. A concentration of fluorine in the range of 0.1 to about 3 weight percent of the catalyst is preferred.

Certain modifications of the invention will become apparent to those skilled in the art and the illustrative details disclosed are not to be construed as imposing unnecessary limitations on the invention.

I claim:

1. A process for preparing a catalyst comprising a major proportion of silica and a minor proportion of an oxide of a metal selected from the group consisting of Cr, Mo, V, Ni, and Co and mixtures thereof, which comprises ball milling particulate porous silica in admixture with a quantity in excess of that required to completely wet the silica of a liquid selected from the group consisting of water and a $C_1$ to $C_8$ alcohol for at least one hour and until the silica particles are of an average size of less than 25 mircons; separating said liquid from the silica; impregnating the resulting silica particles with a solution of a compound of the selected metal convertible to the oxide by calcination; and calcining the resulting composite at a temperature in the range of about 750 to 1500° F. for a period of at least several hours to convert the metal compound to the oxide and activate said catalyst.

2. The process of claim 1 wherein the metal oxide is chromium oxide.

3. The process of claim 1 wherein said liquid is a $C_1$ to $C_8$ alcohol.

4. The process of claim 3 wherein said liquid is methanol.

5. The process of claim 2 wherein said liquid is ethanol.

6. The process of claim 1 wherein said liquid is water.

7. The process of claim 1 including the step of incorporating in said catalyst an activating amount of fluorine up to about 3 weight percent of the catalyst.

8. The process of claim 7 wherein said metal is Cr and said fluoriding comprises incorporating ammonium fluosilicate in the ball milled silica.

9. The process of claim 1 wherein at least one oxide of the group consisting of alumina, boria, thoria, titania, and zirconia is incorporated in the silica prior to ball milling.

10. A composite catalyst active for polymerization of olefins consisting essentially of porous silica impregnated with at least one metal oxide selected from the group consisting of Cr, Mo, V, Ni, and Co in a concentration in the range of about 1 to 20 weight percent of the catalyst, said silica prior to impregnation with said metal oxide having been ball milled in particulate form in admixture with a quantity of liquid in excess of that required to completely wet all of said silica for at least one hour and until the average particle size of said silica has been reduced to less than 25 microns, said liquid being a member of the group consisting of water and $C_1$ to $C_8$ alcohols.

11. The catalyst of claim 10 wherein said silica has been ball milled in water.

12. The catalyst of claim 10 wherein said silica has been ball milled in a $C_1$ to $C_8$ alcohol.

13. The catalyst of claim 10 wherein said silica has been ball milled in methanol.

14. The catalyst of claim 10 wherein said at least one metal oxide is chromium oxide, said silica having been ball milled in methanol.

15. The catalyst of claim 10 wherein said at least one metal oxide is chromium oxide, said silica having been ball milled in water.

16. The catalyst of claim 1 having incorporated therein an activating amount of fluorine up to about 3 weight percent of the catalyst.

17. The catalyst of claim 10 wherein at least one metal oxide of the group consisting of alumina, boria, thoria, titania, and zirconia is incorporated in said silica in minor amount prior to ball milling.

18. A process for polymerizing a polymerizable olefin which comprises contacting said olefin under polymerizing conditions with a catalyst prepared by the process of claim 1.

19. The catalyst of claim 17 wherein said at least one metal oxide is chromium oxide.

20. The process of claim 18 wherein said liquid is water.

21. The process of claim 18 wherein said liquid is methanol.

22. The process of claim 18 wherein said liquid is ethanol.

23. The process of claim 18 wherein said olefin is ethylene.

24. The process of claim 18 wherein said olefin is ethylene and said liquid is a $C_1$ to $C_8$ alcohol.

25. The process of claim 18 wherein said olefin is ethylene and said liquid is methanol.

26. The process of claim 18 wherein said olefin is ethylene and said liquid is ethanol.

27. The process of claim 18 wherein said olefin is ethylene and said liquid is isopropyl alcohol.

References Cited by the Examiner

UNITED STATES PATENTS

| | | | |
|---|---|---|---|
| 2,504,001 | 4/1950 | Connolly | 252—456 |
| 2,865,868 | 12/1958 | McKinley et al. | 252—467 |
| 2,910,444 | 10/1959 | Cramer | 252—467 |
| 2,969,348 | 1/1961 | Fawcett | 252—458 |
| 2,980,659 | 4/1961 | Witt | 252—458 |
| 2,984,653 | 5/1961 | Witt | 252—458 |
| 2,986,557 | 5/1961 | Banks | 260—94.9 |
| 3,006,909 | 10/1961 | Witt | 260—94.9 |
| 3,130,188 | 4/1964 | Hogan | 260—94.9 |
| 3,132,125 | 5/1964 | Schwander et al. | 260—94.9 |

JOSEPH L. SCHOFER, *Primary Examiner.*

JULIUS GREENWALD, *Examiner.*